United States Patent

Nigon

[11] 4,447,683
[45] May 8, 1984

[54] AUTOMOTIVE BLINKER OR TURN INDICATOR SWITCH

[75] Inventor: Michel Nigon, Sartrouville, France

[73] Assignees: Automobiles Peugot; Automobiles Citroen, both of France

[21] Appl. No.: 332,228

[22] Filed: Dec. 18, 1981

[30] Foreign Application Priority Data

Dec. 24, 1980 [FR] France ............................ 80 27532

[51] Int. Cl.³ .......................................... H01H 3/16
[52] U.S. Cl. ............................. 200/61.27; 200/61.3; 200/61.31
[58] Field of Search ................. 200/6 R, 6 B, 6 BA, 200/6 BB, 6 C, 17 R, 18, 61.39, 61.27–61.38, 61.54

[56] References Cited

U.S. PATENT DOCUMENTS

| | | | |
|---|---|---|---|
| 1,528,116 | 3/1925 | Laycock et al. | 200/61.31 |
| 2,427,595 | 9/1947 | Fuller | 200/61.34 |
| 3,201,536 | 0/1965 | Fisher | 200/61.34 |
| 3,251,956 | 5/1966 | Rasor et al. | 200/6 B X |
| 3,373,252 | 3/1968 | Ghaem-Maghami et al. | 200/6 R |

*Primary Examiner*—J. R. Scott
*Attorney, Agent, or Firm*—Steinberg & Raskin

[57] ABSTRACT

A device for automatically and selectively breaking an electric circuit, comprising an actuating member such as a steering column with which is associated a freely rotatable cam and two stops limiting the cam rotation to an angle below 90° so that the cam may act on movable contact pieces positively or not in accordance with the motion of the actuating member in one direction or the other direction, the device being applicable to the operation of the blinkers of an automotive vehicle.

6 Claims, 11 Drawing Figures

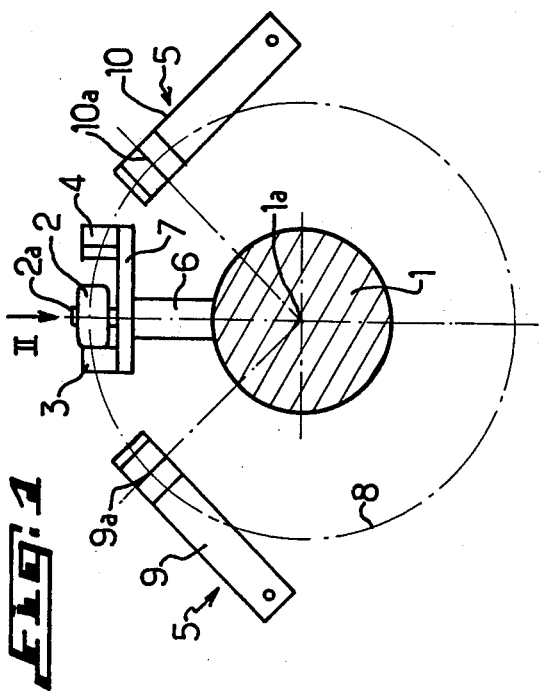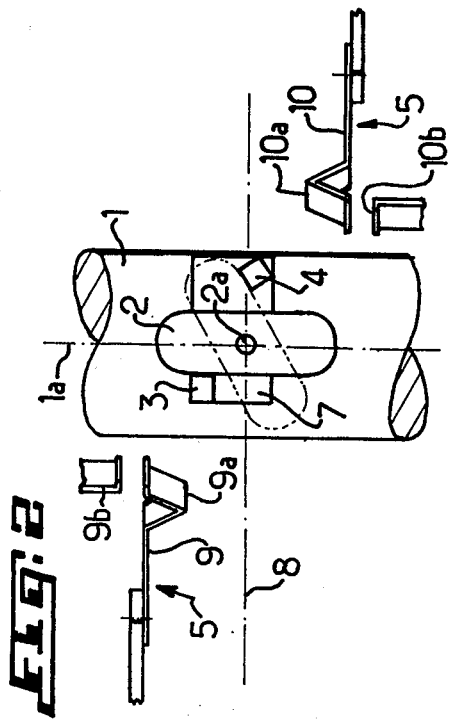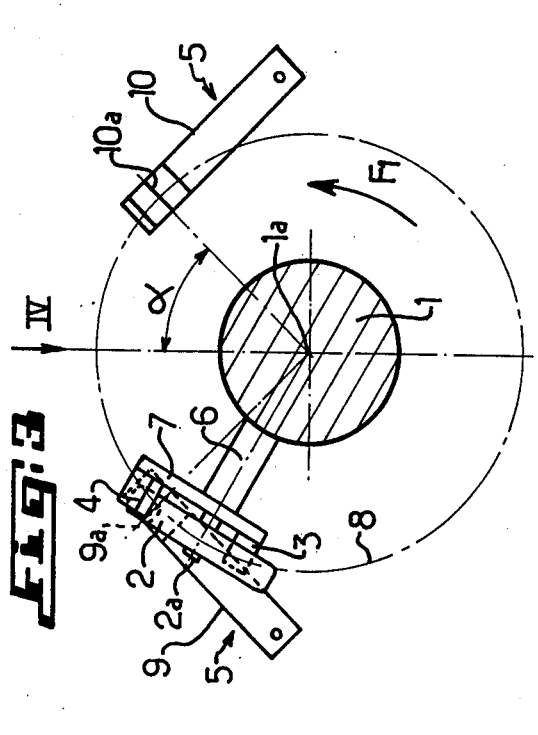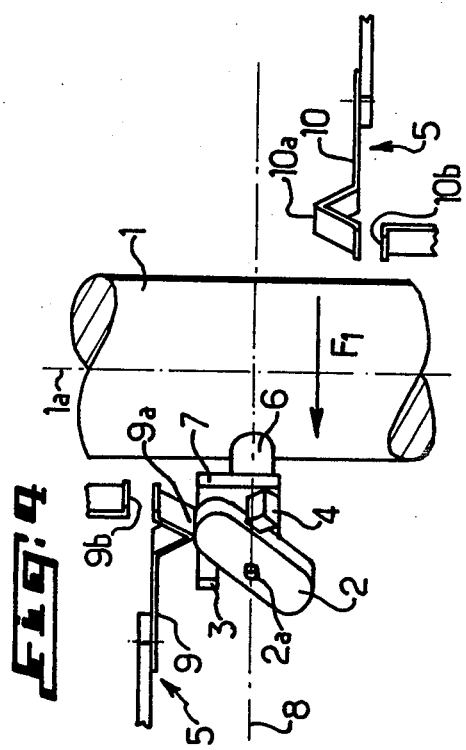

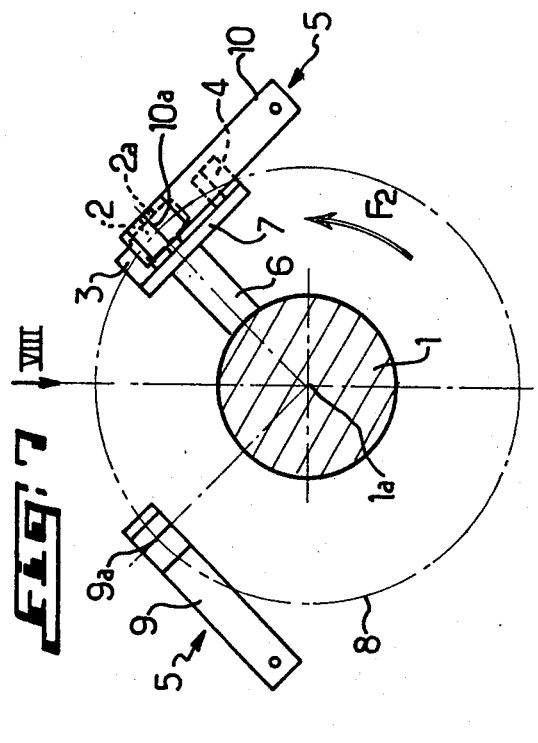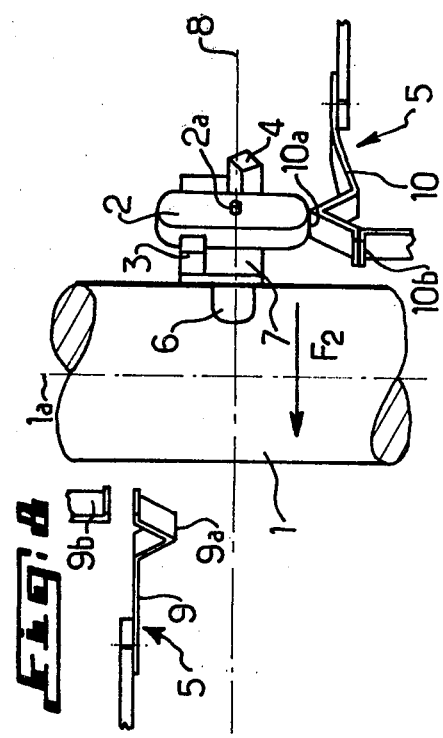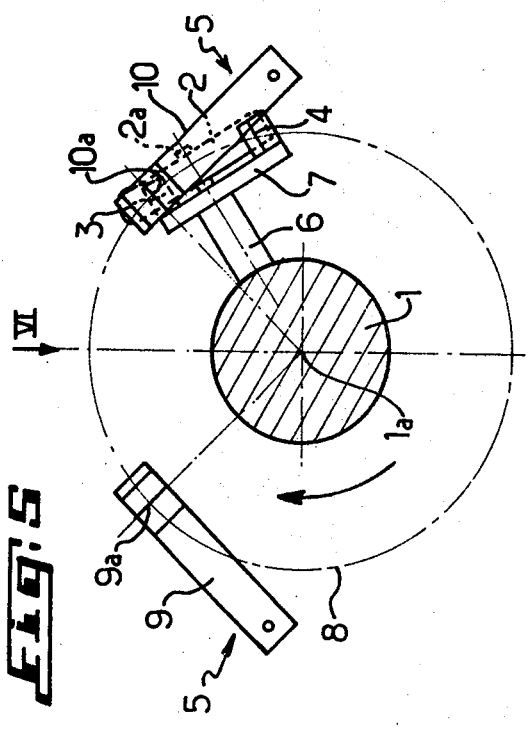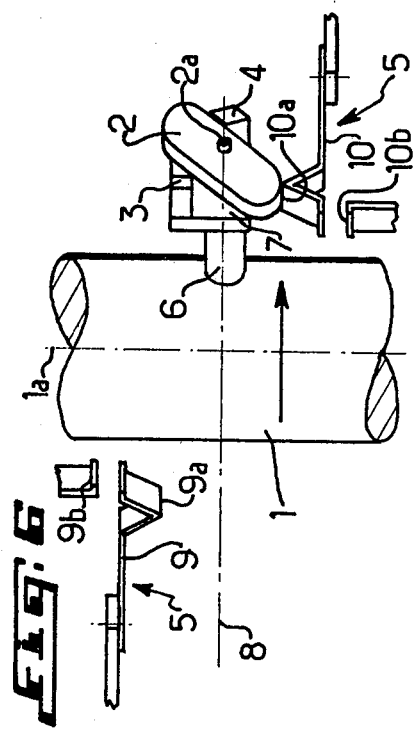

AUTOMOTIVE BLINKER OR TURN INDICATOR SWITCH

BACKGROUND OF THE INVENTION

The present invention relates essentially to a switch device for the automatic and selective control of an electric circuit.

It is more particularly directed to a switch device for automatically breaking the electric circuit of a direction indicator of an automotive vehicle.

It is known that the intention to change the running direction of an automotive vehicle may be indicated by the energizing of an electric circuit which operates flashing lights or blinkers on the left or on the right side of the vehicle. Such an energizing of the left or right blinker may be carried out by depressing a button located for instance near the steering wheel of the vehicle and operating the emission of electric pulses or also merely by turning in one direction or in the other direction a small lever easily accessible to the driver holding the steering wheel.

In either case, the breaking of the electric circuit of the blinkers is generally performed automatically when the driver after having made a turn moves the steering wheel back to its neutral position corresponding to a path of travel in a straight line of the vehicle. Thus in the case of operating a blinker by a lever, the automatic return of the lever causing the electric circuit to be broken is provided by a mechanical friction system which becomes operative upon the return of the steering wheel to its neutral position.

The electric circuit breaking control systems proposed hitherto however have the following significant inconvenience. When a driver wishes to negotiate a bend or a corner or to make a right-hand turn, for example, he actuates the blinker control for energizing the electric circuit so as to allow the right-hand blinker to be lit or switched on. However, before making the turn to the right side, he should most of the time steer towards or lock over in the opposite direction i.e. slightly rotate the steering wheel to the left side in order to disengage itself so as to properly negotiate the right-hand turn. It frequently occurs that this locking-over in the opposite direction and the corresponding slight rotation of the steering wheel to the left is sufficient to cause the right-hand blinker to be automatically switched out which as will be appreciated is not desirable since the driver initially wished to indicate that he will turn to the right.

The above-described action is undesirable because after having locked over in the opposite direction the driver is then compelled to operate his blinker control a second time after having locked over in the opposite direction and since such a counter-locking over would stop the operation of the blinker, the warning for a right-hand turn is discontinued with respect to following vehicles so that in a border line case this may result in road or traffic accidents.

SUMMARY OF THE INVENTION

The object of the present invention is to obviate the aforesaid inconveniences by providing a new electric circuit breaking device which solves the problem of the undesired break of the blinker control circuit upon a generally slight rotation of the steering wheel in a direction opposite to that in which the steering wheel will be rotated for in order to negotiate a bend or turn. Moreover, the device according to the invention advantageously reduces the sizes of the various controls normally situated near the steering wheels of the vehicles which is of particular interest in modern vehicles wherein as is known the controls have become more and more numerous and sophisticated. Thus in the case of a blinker control through electric pulses the technological requirement of grouping at a same place in the vicinity of the steering wheel the functions of the control of the direction indicator and of the automatic breaking device according to the invention will be removed.

For this purpose the object of the present invention is to provide a device for the automatic and selective control of an electric circuit, of the kind comprising an actuating member likely to act upon at least one part for breaking for instance the electric current flowing through said circuit, said device being characterized in that with the actuating member is associated a freely rotatable cam as well as two stops limiting the rotation of said cam to such an angle that the cam may or may not positively act upon said part in accordance with the action of the actuating member in one direction or in the other direction.

According to another characterizing feature of the invention, both of the stops are so arranged on the actuating member that they define the limit of the rotation of said cam to any angle smaller than about 90°.

According to a preferred exemplary embodiment said cam is mounted endwise of a shaft extending substantially at right angles to the center line axis of the actuating member, which shaft forms a support for both of the stationary stops arranged on either side of said cam.

It should also be noted that in the path of travel of the cam and of the stops associated with the actuating member is provided in two different planes at least one element forming for instance a resilient blade or strip with a boss-like formation which may or may not positively cooperate with the cam for switching the electric current passing through the circuit on or off.

According to a further embodiment, in said path of travel of the cam and of its associated stops is disposed one of the two legs of a lever for energizing said electric circuit.

According to still another characterizing feature, said actuating member is constituted for instance, by the steering column of a vehicle whereas the resilient strip or blade means or said lever are associated with a blinker control circuit of this vehicle.

It should be pointed out that both of the strips or blades or both legs of said lever are arranged symmetrically on either side of the axial plane of the neutral position of the actuating member or of said steering column, i.e. on either side of the cam and its associated stops for such a neutral position.

According to a preferred embodiment the cam consists of a parallelepipedic block with rounded ends the pivot axis of which extends substantially through the center of said block so as to allow an action of said cam on either side of said axis, the aforesaid resilient blades or strips or lever legs being arranged on either side of the path of travel of the cam.

The invention is also directed to a vehicle with blinkers or flashing light controlled by a device complying with one or more of the abovementioned characterizing features.

BRIEF DESCRIPTION OF THE DRAWINGS

The invention will be better understood and further objects, characterizing features, advantages and details thereof will appear more clearly as the following explanatory description proceeds with reference to the accompanying diagrammatic drawings which have been given by way of non-limiting example only illustrating a presently preferred specific embodiment of the invention and wherein:

FIG. 1 is a diagrammatic end view of a steering column in neutral position for allowing the vehicle to move in a straight line, and with which are associated contact pieces for breaking the electric blinker control circuit of the vehicle;

FIG. 2 is a top view of the assembly shown in FIG. 1, as seen in the direction of the arrow II of FIG. 1;

FIGS. 3 and 4 are views corresponding to FIGS. 1 and 2, respectively, but showing the steering column in the course of locking-over to the left side, FIG. 4 being a view in the direction of arrow IV of FIG. 3;

FIGS. 5 and 6 are views corresponding to FIGS. 1 and 2, respectively, but showing the steering column in the course of being turned to the right side, FIG. 6 being a view in the direction of arrow VI of FIG. 5;

FIGS. 7 and 8 are views corresponding to FIGS. 1 and 2, respectively, but showing the steering column in the course of returning to the neutral position corresponding to the running of the vehicle in a straight line, FIG. 8 being a view in the direction of arrow VIII of FIG. 7;

DETAILED DESCRIPTION OF THE PREFERRED EMBODIMENTS

Figure 11:
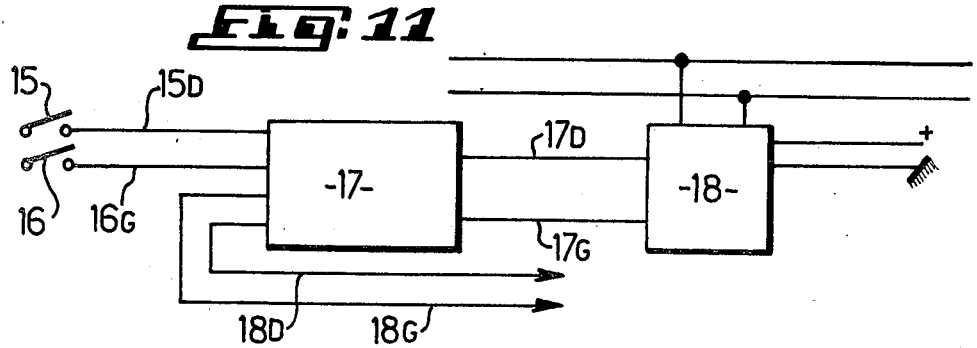
FIG. 11 is a diagrammatic view of an exemplary embodiment of the electric blinker control circuit.

According to the exemplary embodiment shown in FIGS. 1 to 8 an automatic breaking or switch device according to the invention essentially comprises an actuating member 1 with which is associated a cam 2 mounted for free rotation on the member 1 as well as two stops 3 and 4 adapted to limit the rotation of the cam 2 to an angle such that it may or may not act positively upon at least one part 5 capable of breaking the electric current passing through an electric circuit such as for instance the one shown in FIG. 11 in accordance with the displacement of the actuating member 1 in one direction or in the other one.

As clearly apparent from the Figures the cam 2 is mounted for free rotation endwise of a shaft 6 extending substantially at right angles to the center line axis 1a of the actuating member 1 which in the example shown is the steering column of a vehicle. It should be understood that the actuating member 1 could be constituted by any other element displaceable in rotation or according to a translatory motion in one direction or in the other one such for instance as a rod, a toothed rack or a relay box for the transmission of the motion to the wheels of the vehicle.

The stops 3 and 4 are secured onto a supporting plate 7 fast with the shaft 6. These stops are located on either side of the axis of rotation 2a of the cam 2 so as to limit the free rotation of said cam to an angle below 90° as seen in particular on FIGS. 2 and 10.

The cam 2 according to the exemplary embodiment shown is constituted by a parallelepipedic block the ends of which are rounded and the pivot axis 2a of which extends substantially through the center of said block so as to allow the cam 2 to exert an action on either side of the axis 2a upon the parts 5.

It may thus be appreciated that the cam 2 and its associated stops 3 and 4 under the effect of the rotation in one direction or in the other one of the steering column 1 would follow a circular path of travel 8 seen in the Figures and in which path the parts 5 are located.

According to the embodiment shown in FIGS. 1 to 8 the parts 5 are two in number. They are situated in two different planes on either side of the circular path of travel 8 of the cam 2 and comprise respectively a resilient strip or blade 9, 10 with a boss-like formation 9a, 10a adapted to so as to be in cooperating or non-cooperating relationship with the cam 2 as will be explained later, such a cooperation of the cam 2 in a positive or non-positive manner with the boss-like formation 9a or 10a causing the electric circuit of FIG. 11 to be broken or not broken depending on whether the boss-like formation 9a, 10 a would or would not contact the power supply on board the vehicle as denoted at 9b, 10 b on FIGS. 2, 4, 6 and 8.

Figure 9:
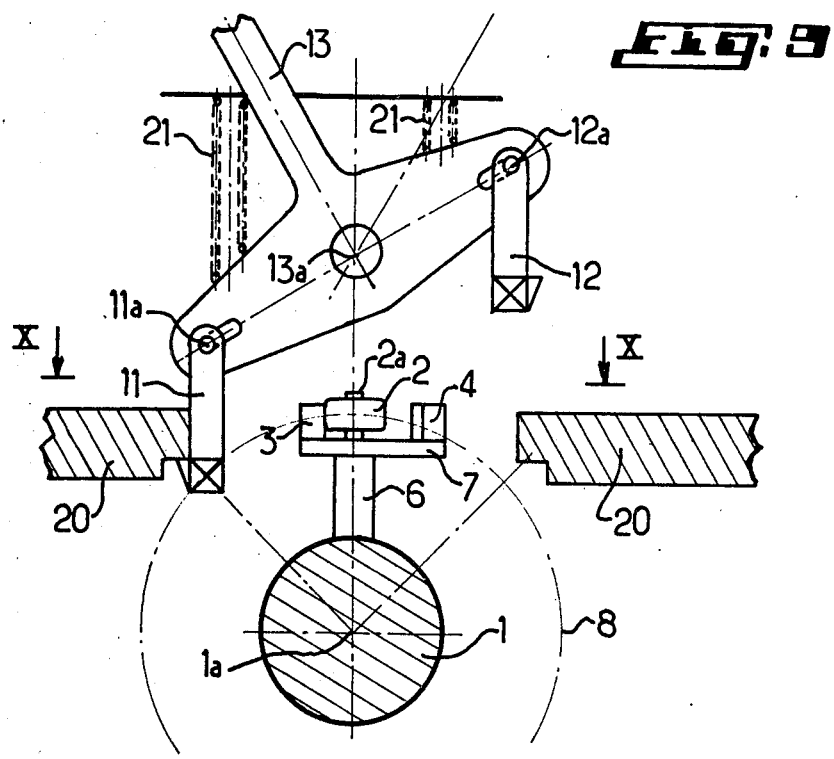
FIG. 9 is an end view of the steering column with which is associated a lever for operating the blinkers of the vehicle.
Figure 10:
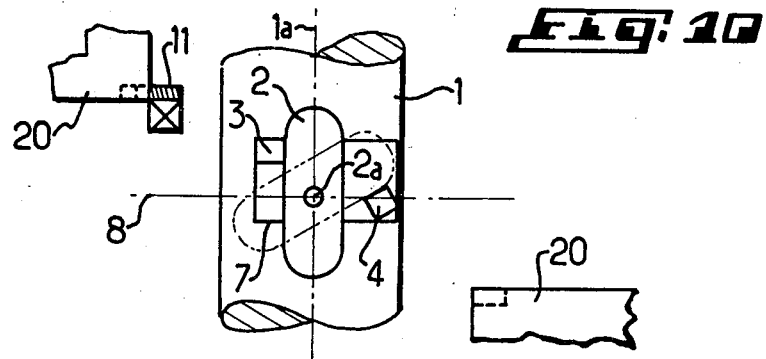
FIG. 10 is a bottom view of the embodiment shown in FIG. 9, in cross-section taken upon the line X—X of FIG. 9.

According to the embodiment shown on FIGS. 9 and 10, it is seen that in the path of travel of the cam 2 and its associated stops 3 and 4 is placed one leg 11 of the two legs 11, 12 of a lever 13 for energizing an electric circuit (not shown), which circuit is for instance a control circuit for operating the left and right blinkers of a vehicle. The legs 11 and 12 are pivotally connected at 11a and 12a, respectively, to the lever 13 which may swing in one direction or in the other one about the axis 13a so as to provide for the previous energizing of the electric circuit according to whether the driver wishes to operate the right-hand or the left-hand blinker.

Referring again to FIG. 1 which shows the actuating member or steering column 1 in the neutral position corresponding to a path of travel in a straight line of the vehicle it is seen that the resilient blades or strips 9, 10 as well as the legs 11 and 12 of the lever 13 of the embodiment shown in FIGS. 9 and 10, are arranged symmetrically on either side of the axial plane of neutral position of the steering column 1, i.e. on either side of the cam 2 and of its associated stops 3, 4 for such a neutral position.

In order to set forth more clearly the operation of the device according to the invention which has just been described the essential component parts constituting the electric circuit shown on FIG. 11 will now be described briefly.

This circuit is an example of a circuit for controlling the blinkers through electric pulses and essentially comprises contact pieces 15, 16 on which a driver acts to indicate an intended change in direction to the right or to the left side. Thus, the control pulse for the right or left blinker is conveyed through the line 15D or 16G, respectively, to a logic circuit 17 for maintaining the operation of the blinker involved. At 18 has been diagrammatically shown a flashing pilot station connected on the one hand to the logic circuit 17 through the lines 17D and 17G for controlling the right and left blinkers, respectively, and on the other hand to the control circuits for the rear right, front right, rear left and front left flashing lights designated by the reference characters ARD, AVD, ARG and AVG, respectively. At last at 18D and 18G are shown lines leading to the logic circuit 17 and providing respectively for the passage of the stop pulses for the right and left blinker. These lights are connected to the contact pieces 9 and 10 previously described and co-operating with the device according to the invention which will be described hereinafter with particular reference to FIGS. 1 to 8, upon starting from the relative positions of the steering column 1 and resilient strips 9, 10 shown on FIG. 1, wherein the steering column 1 is in the neutral position, i.e. for which the vehicle follows a substantially straight or rectilinear path of travel.

It is assumed that the driver of the vehicle wishes to take a bend or make a turn to the right and that he therefore will have previously energized the circuit shown on FIG. 11 by acting upon the switch 15 so that an electric pulse be fed to the logic circuit 17 adapted to keep the right-hand blinker operating and also to the central pilot station 18 for initiating the operation or switching-on.

If the path of travel of the vehicle is very sinuous or of winding character or if as explained at the beginning of this description the driver before turning to the right wishes to carry out a counter-locking over, i.e., slight steering to the left side before negotiating the bend, he would cause the steering column 1 to rotate to the left as shown by the arrow $F_1$ on FIGS. 3 and 4. Upon such a counter-locking over to the left side the cam 2 when passing underneath the strip or blade 9 corresponding to the left-hand blinker will retract itself upon being engaged by the boss-like formation 9a. This counter-locking over may be carried out over a very large angle, i.e. of 360°—α which is a very great angle with respect to the prior art devices wherein as previously explained even a small leftward rotation of the steering wheel is sufficient to discontinue or stop the operation of the blinker. It should be added that on the drawings the resilient blade 9 corresponds to the left-hand blinker whereas the resilient blade 10 corresponds to the right-hand blinker.

Having thus performed his counter-locking over step without affecting the operation of the right-hand blinker the driver will now make his turn to the right as shown on FIGS. 5 and 6. In other words if it is assumed that upon the counter-locking over step the cam 2 has moved beyond the boss-like formation 9a which may occur in the case of a counter-locking over step of substantial extent the cam 2 upon the return of the steering column 1 will again be engaged with the boss-like formation 9a and positively act on said boss-like formation since the cam 2 will be blocked by the stop 3. Thus the boss-like formation 9a will come into engagement with the element 9b but it is of no importance that the operation of the left-hand blinker be discontinued because the latter is not energized according to said initial assumption. The cam 2 as seen on FIG. 6 will then retract itself by passing over the boss-like formation 10a of the resilient strip 10 corresponding to the right-hand blinker. Thus the latter will not be switched off upon a turn to the right side made by the driver. It will be appreciated that such a turn to the right side may be very substantial and correspond to several revolutions of the steering column 1 without exerting any influence upon the right-hand blinker.

When now the driver wishes to have again his vehicle running in a straight line he will turn his steering wheel hence the steering column 1 towards the left as shown by the arrows $F_2$ on FIGS. 7 and 8. Thus, upon the first meeting or engagement of the cam 2 with the boss-like formation 10a of the blade 10 the cam 2 will move to its upstanding position and thus bear against the stop 3 as seen on FIG. 8 and the bottom portion of said cam will depress or deflect the boss-like formation 10a downwards into engagement with the element 10b thereby cutting off the energy supply to the right-hand blinker. More specifically the engagement between the boss-like formation 10a and the element 10b will discontinue in the right-hand flashing circuit of FIG. 11 the operation of the blinker central pilot station 18.

It is obvious that the foregoing operating steps for a driver wishing to make a turn to the left after having performed a counter-locking over to the right would be the same as before but carried out in the reverse order.

With respect to the embodiment shown in FIGS. 9 and 10, it should be noted that the operation is the same as that described with reference to the embodiment shown in FIGS. 1 to 8 except that the cam 2 may or may not act on the legs 11, 12 of the lever 13 which legs may temporarily catch on a stationary element 20 and may be drawn back by springs 21. The lever controls contact pieces or switches (not shown) which are connected to an electric blinker control circuit which has also not been shown here.

It should be pointed out that the possible angle of counter-locking over before an undesired discontinuation of the electric energy supply to the blinker is very large with respect to the desired small angle for achieving the automatic cut-off of the blinker after an action of negotiating a small bend or turn. Now this was not at all the case with the systems known hitherto which were generally based on the principle of return through friction on the steering column and which necessarily discontinued the operation of the blinker for a very small counter-locking over action, which was very disadvantageous from the safety standpoint. It should at last be added that the device according to the invention applied to the principle of control through electric pulses as diagrammatically shown on FIG. 11 allows the installation of the systems for starting the blinkers to be fully dissociated from those required for their discontinuance.

Thus has been provided according to the invention an automatic and selective breaking device which solves a very particular problem by a mechanical approach which has never been conceived or designed before.

It should be understood that the invention is not at all limited to the embodiments described and shown which have been given by way of example.

Thus instead of applying the system according to the invention to the rotation of the steering column it could well be applied to the linear displacement of a steering rack or also as a general rule to any other suitable actuating member without departing from the scope of the invention.

The invention thus comprises all the technical equivalents of the means described as well as their combinations when the same are carried out within the scope of protection as claimed.

What is claimed is:

1. Automotive blinker or turn indicator switch apparatus for a vehicle, having an actuating member which is movable in two directions, said switch apparatus adapted to make or break an electric circuit including at least one blinker, comprising:

cam mounting means including shaft means fixed at one of its ends to the actuating member;

an elongated cam pivotally mounted on a free end of said shaft means for free rotation with respect to said shaft means about an axis of rotation, said cam describing a path of travel upon movement of the actuating member;

stop means mounted on said mounting means for limiting the free rotation of said cam to an angle of less than 90° in either the clockwise or counter-clockwise direction, said stop means including plate means fixedly mounted on said shaft means and a pair of stop members secured on said plate means; and a pair of parts for making and breaking the electric circuit, each part being mounted at a respective lateral side of said cam along said path of travel thereof and being located on a respective one of the sides of a plane which is perpendicular to an axis of said actuating member and which passes through the axis of rotation of said cam;

whereby said cam positively acts on a certain one of said parts upon movement of the actuating member as determined by the particular direction in which the actuating member is moved.

2. The combination of claim 1 wherein said actuation member is constituted by a rotatable steering column of the vehicle, and wherein said shaft means extends at a substantially right angle to the longitudinal axis of rotation of said steering column, said path of travel described by said cam upon rotative movement of said steering column comprising a circular path of travel of said cam and plate means, and wherein said parts are situated on the circular path of travel of said cam and plate means.

3. The combination of claim 1 wherein said elongated cam is constituted by a parallelepipedic block having a pair of opposed rounded ends and wherein said cam is freely rotatable about an axis of rotation constituting the axis of said shaft means, said cam axis of rotation passing through the substantial center of said block, whereby said ends of said block cooperate with said pair of stop members and parts, respectively.

4. The combination of claim 1 wherein said two parts each comprise a resilient blade having a boss-like portion adapted to cooperate with said cam ends.

5. The combination of claim 2 wherein said two parts are situated symmetrically on respective sides of a plane passing through the axis of rotation of said steering column and the axis of said shaft means with said steering column in a neutral position.

6. Automotive blinker or turn indicator switch apparatus for a vehicle, having an actuating member which is movable in two directions, said switch apparatus adapted to make or break an electric circuit including at least one blinker, comprising:

cam mounting means including shaft means fixed at one of its ends to the actuating member;

an elongated cam pivotally mounted on a free end of said shaft means for free rotation with respect to said shaft means about an axis of rotation, said cam describing a path of travel upon movement of the actuating member, being constituted by a parallelepipedic block having a pair of opposed rounded ends, wherein said cam axis of rotation constitutes an axis of said shaft means and passes through the substantial center of said block;

stop means mounted on said mounting means for limiting the free rotation of said cam to an angle of less than 90° in either the clockwise or counter-clockwise direction, said stop means including plate means fixedly mounted on said shaft means and a pair of stop members secured on said plate means;

a pair of parts for making and breaking the electric circuit, each part being mounted at a respective lateral side of said cam along said path of travel thereof and being located on a respective one of the sides of a plate which is perpendicular to an axis of said actuating member and which passes through the axis of said shaft means; and a movably mounted lever for energizing the electric current, wherein said two parts each comprise a leg member hingedly connected to said lever;

whereby said cam positively acts on a certain one of said parts upon movement of the actuating member as determined by the particular dlirection in which the actuating member is moved, and said ends of said block cooperate with said pair of stop members and parts respectively.

* * * * *